US006487396B1

(12) United States Patent
Sassi (10) Patent No.: US 6,487,396 B1
(45) Date of Patent: Nov. 26, 2002

(54) ELECTRONIC DEVICE AND A CONTROL MEANS

(75) Inventor: Heikki Sassi, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/321,940

(22) Filed: May 28, 1999

(30) Foreign Application Priority Data

Jun. 2, 1998 (FI) .................................................. 981244

(51) Int. Cl.⁷ ............................. H04B 1/38; G09G 5/08
(52) U.S. Cl. ......................... 455/90; 455/556; 455/575; 345/167
(58) Field of Search ......................... 455/90, 575, 550, 455/556, 557; 379/433, 429, 428; 345/161, 163, 164, 167

(56) References Cited

U.S. PATENT DOCUMENTS

| 5,337,346 A | * | 8/1994 | Uchikura ..................... 455/556 |
| 5,436,954 A | | 7/1995 | Nishiyama et al. ........... 379/58 |
| 5,479,476 A | | 12/1995 | Finke-Anlauff .............. 379/58 |
| D367,061 S | * | 2/1996 | Davison .................... D14/218 |
| 5,584,054 A | * | 12/1996 | Tyneski et al. ......... 455/575 X |
| 5,646,649 A | * | 7/1997 | Iwata et al. ............. 455/575 X |
| 5,767,841 A | * | 6/1998 | Hartman ..................... 345/167 |
| 5,797,089 A | * | 8/1998 | Nguyen ..................... 455/556 |
| 5,812,954 A | | 9/1998 | Henriksson ................. 455/550 |
| 5,819,175 A | | 10/1998 | Niemi ....................... 455/418 |
| 5,877,709 A | | 3/1999 | Ala-Lehtimaki et al. ...... 341/26 |
| 5,887,264 A | | 3/1999 | Kohler ....................... 455/461 |
| 5,892,475 A | | 4/1999 | Palatsi ....................... 345/352 |
| 5,896,575 A | * | 4/1999 | Higginbotham et al. ..... 455/575 X |
| 6,014,573 A | * | 1/2000 | Lehtonen et al. ........... 455/556 |

FOREIGN PATENT DOCUMENTS

| DE | 42 19 887 C1 | 11/1993 |
| DE | 44 00 668 A1 | 7/1995 |
| EP | 0 715 441 A1 | 6/1996 |
| EP | 0 755 142 A2 | 1/1997 |
| GB | 2 318 944 A | 5/1998 |

OTHER PUBLICATIONS

Patent Abstracts of Japan JP 9198352.
Finnish Official Action (and English translation thereof).

* cited by examiner

*Primary Examiner*—Tracy Legree
(74) *Attorney, Agent, or Firm*—Perman & Green, LLP (57) ABSTRACT

An electronic device which comprises a first housing part (2, 3), provided with a first inner surface (2a, 3a) and a first outer surface (2b, 3b), a second housing part (2, 3), provided with a second inner surface (2a, 3a) and a second outer surface (2b, 3b), hinge means (4) for moving the housing parts (2, 3) to a closed position (S) and to a opened position (A), a first user interface (5a, 5b, 6a, 6b), which is at least partly located on the inner surface (2a, 3a) of one or more housing parts (2, 3), and a second user interface (5a, 5b, 6a, 6b), which is at least partly located on the outer surface (2b, 3b) of one or more housing parts (2, 3). The first housing part (2, 3), the second housing part (2, 3) or both housing parts (2, 3) comprise a control means (7) extending through the housing part (2, 3).

21 Claims, 4 Drawing Sheets

ELECTRONIC DEVICE AND A CONTROL MEANS

BACKGROUND OF THE INVENTION

1. Field of the Invention

This invention relates to an electronic device according to the preamble of the appended claim 1. This invention also relates to a control means according to the preamble of the appended claim 7.

2. Prior Art

In wireless communication devices of prior art, their functions are primarily controlled by using a keyboard. Furthermore, a wireless communication device, such as a mobile station, comprises a display, by means of which it is possible to display information for the user of the mobile phone. The user can, for example, set and activate mobile phone functions, for example select different ringing tones, with a so-called menu function. Usually, there is a variety of such options connected to the menu function, wherein all alternatives cannot be presented at the same time on the display. Such mobile phones are usually provided with particular browser keys as control means, with which the user can scan the options forward and backward. These forward and backward browser keys are usually implemented as mechanical keys, which can be pressed to select the following or the preceding alternative. In a corresponding fashion, it is possible to select a desired number from telephone numbers stored in the mobile phone, usually by retrieving the number on the display of the mobile phone with these browser keys.

In connection with PC (Personal Computer) devices, portable computers, and wireless communication devices, different control means have become known for controlling the functions of these devices. Such control means include, for example, one or more keys located by the display, wherein a keystroke selects the desired control function indicated by providing the command of the function in writing, or a symbol illustrating the same, in the display in the vicinity of the key. In different situations, the control function selectable at a time is illustrated in such a way that the command representing the function is output to the display by the control program of the device, wherein the same key can be used to select different functions. The keyboards of PC devices typically also contain keys for moving the cursor up, down, to the left, or to the right on the display. One known control device is a mouse which can be connected to a PC device, and which comprises a control means, such as a track ball, for moving the cursor on the display of the PC device, and one or more control means, typically control buttons, for the purpose of e.g. selecting functions from the menu on the display, or for activating the menu itself. In connection with portable computers, a track ball and control buttons placed in connection with the keyboard and corresponding to the functions of a mouse have also become known, as well as a touch screen for controlling the cursor.

In connection with mobile phones, a known control means, disclosed in publication EP 0 755 142 A2, is a rotary discoidal control roll, placed on the side of a mobile phone, by means of which it is possible to move in a telephone directory displayed on the display of the mobile phone, and which control roll is pressed to select a desired telephone number. With the help of the control roll, it is also possible to move in menus and to select a desired alternative by pressing the control roll. According to the publication EP 0 715 441 A1, in a foldable mobile phone, a cylindrical control roll, rotatable around its longitudinal axis, can also be placed in connection with a hinge, substantially parallel to and on the same axis with the hinge. Thus, it is also possible to place a control button in the vicinity of the control roll, for example for the purpose of selecting and activating a function retrieved from the menu by means of the control roll. From publication U.S. Pat. No. 5,436,954 it is also known that a control roll placed on a hinge, can be moved at least a short distance in the direction of its longitudinal axis, wherein the control roll also functions as a control button.

Furthermore, in connection with portable laptop PC devices, a control device is known which functions in a similar way as the aforementioned mouse, wherein one control means, i.e. a joystick-type control lever, a control stick, or the like, corresponding to the track ball of the mouse, is placed next to the display located on one side of the housing part of the device, and the side opposite to the housing part is equipped with control means, i.e. buttons, corresponding to the two control buttons of the mouse. The above-described control device is used for example in such a way that the control lever is controlled with the thumb, the first control button is pressed with the forefinger, and the second control button with the middle finger. With this control lever the cursor can be moved consirerably faster than in solutions in which the cursor is moved with separate keys. The cursor can even be moved with one finger simultaneously both in direction x and y.

The features of wireless communication devices, such as mobile phones, increase constantly, and typically include functions for storing e.g. telephone numbers of persons and firms. In a known manner, there are also devices available, which contain two different user interfaces combined, for example the user interfaces of a wireless communication device and a PDA device. One such device of prior art is Nokia Communicator 9000, i.e. a communicator which has a first user interface, i.e. the PDA interface, whereby it is possible to store various data in the device, to have a wireless connection to the Internet network, and to receive for example telecopier messages, and which has a second user interface, i.e. the CMT user interface (Cellular Mobile Telephone), whereby it is possible to perform conventional mobile phone functions, such as receiving a call and selecting a phone number. The communicator described above comprises separate keypads and displays for the two user interfaces; the PDA user interface is arranged to be used in the opened position of the device, and the CMT user interface is arranged to be used in the closed position of the device.

In devices of prior art, which comprise various user interfaces, such as a PDA user interface and a CMT user interface, for each user interface, control means separate from other user interfaces are used, such as select buttons or keys for controlling the cursor. However, these control means increase the need for space, especially in cases when smaller and lighter versions of the devices are manufactured. The situation is problematic in devices, in which different user interfaces are used in different positions, for example in the opened and closed position of the above presented communicator.

The purpose of this invention is to provide an improvement in the prior art and to introduce a new control means type to enhance the usability of electronic devices. An electronic device according to the invention is characterized in what will be presented in the characterizing part of the appended claim 1. A control means according to the invention is characterized in what will be presented in the characterizing part of the appended claim 7. The invention is based on the idea that the control means is used in connection with the electronic device at least from two, for example substantially opposite directions.

With the present invention, several significant advantages are achieved. A particular advantage of the invention is that the same control means can be used in connection with two or more separate user interfaces of a device. Thus, the need for several separate control means decreases, and at the same time, the space used by the control means is diminished, compared with prior art. Another advantage of the invention is that the manufacturing costs of the device are reduced, because the number of control means can be decreased more than is possible in solutions of prior art, and a simpler structure of the device is attained.

Moreover, a particular advantage of the invention is that the same control means can now be used from at least two different directions, which increases the possibilities to use the control means also in devices with only one user interface. The user can select the method for handling the control means more freely than in connection with control means and control devices of prior art, which can usually be handled from only one direction, substantially perpendicular to the surface of the device. With the invention, a particular advantage with respect to usability is achieved, especially when the device is provided with at least two separate user interfaces, which are used in two different positions of the device.

Thanks to the use of a control means according to the invention, the advantage achieved with devices containing one or more user interfaces is that it is now easy to control and move the control means with a pressing hold of two fingers, for example with the thumb and the forefinger, wherein the movement can be controlled more accurately than when controlling with one finger.

SUMMARY OF THE INVENTION

According to a preferred embodiment of the invention, the control function of the control means for the user interface used at a time is selected automatically on the basis of the position of the housing part of the device. Thus, the user does not need to select the control function, whereby malfunctions decrease in comparison with such a situation that the user has to select this control function of the control means separately for each user interface. It is, of course, obvious that the control function can be substantially similar in connection with different user interfaces, or that the control function can be changed when using only one user interface.

Furthermore, according to a preferred embodiment of the invention, the control means is also arranged like a control button, to move substantially perpendicularly with respect to the surface of the device, wherein several different functions can be connected to the same control means. A function corresponding to the control button can also be arranged by placing at least one control button in a stick-like or joystick-type control means, for example on one end of the pin, wherein it is possible both to move the control means and to press the control button simultaneously with one finger at the desired moment.

BRIEF DESCRIPTION OF THE DRAWINGS

In the following, the invention will be described in more detail with reference to the appended figures, in which.

DETAILED DESCRIPTION OF THE PREFERRED EMBODIMENTS

Figure 1:
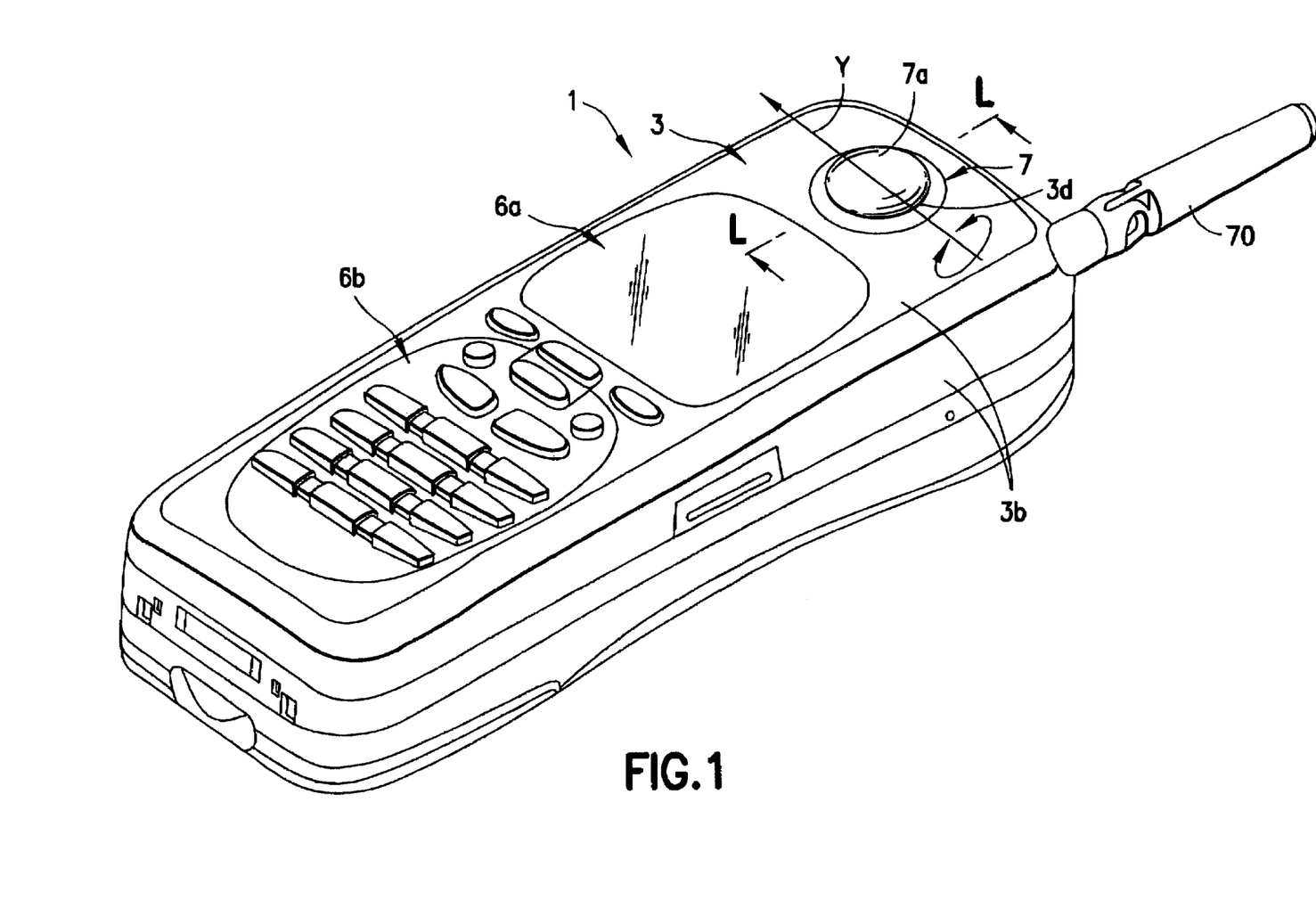
FIG. 1 shows, in a perspective view, an electronic device according to a preferred embodiment of the invention in a closed position.
Figure 2:
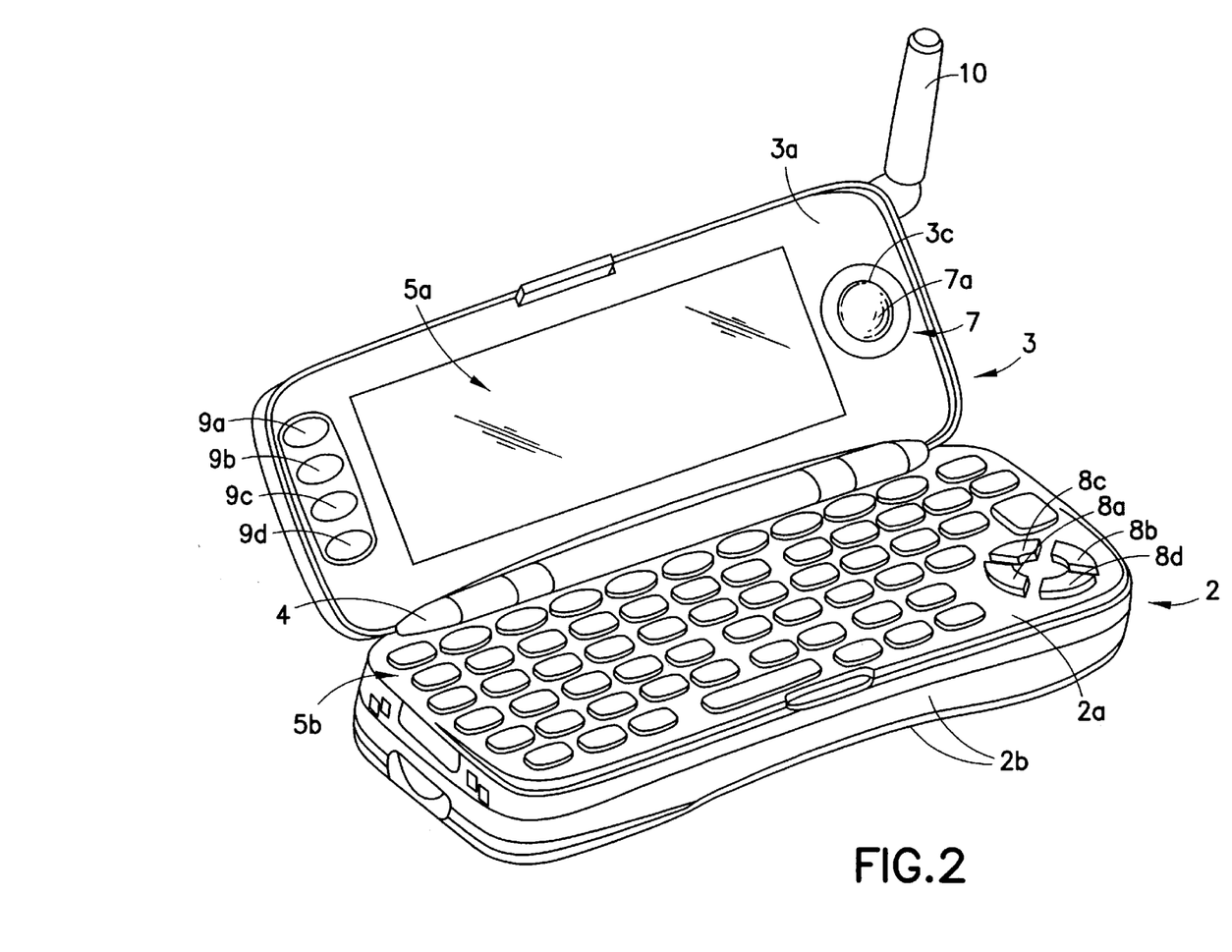
FIG. 2 shows, in a perspective view, an electronic device according to a preferred embodiment of the invention in an opened position.

With reference to FIGS. 1 and 2, the control means according to the invention will be presented as applied in connection with an advantageous electronic device. It is, however, obvious for anyone skilled in the art, how the control means in question can be applied, within the scope of the claims, to be used also in connection with other electronic devices, for example such devices which comprise only one user interface (UI). Thus, the electronic device comprises, for example, only one housing part and one input and display means located in the same. *In this description, the user interface (UI) typically refers for example to input and display means $5a$–$5b$ or $6a$–$6b$, which are used to operate the device 1 in different positions A and S to input and to display information. Thus, the device 1 comprises a first user interface $5a$–$5b$ and a second user interface $6a$–$6b$. The user interfaces are not, however, solely restricted to the above presented kind of input and display means $5a$–$5b$ and $6a$–$6b$, but the user interface can comprise for example several display elements $5a$, or merely a touch screen.

Further referring to FIGS. 1 and 2, an electronic device 1 according to the invention, i.e. the device 1, comprises a first housing part 2, provided with at least an inner surface $2a$ and an outer surface $2b$, and a second housing part 3, provided with at least an inner surface $3a$ and an outer surface $3b$. The outer surface $2b$ or $3b$ also consists of the surfaces on the sides of the housing parts 2 or 3. The device 1 also comprises hinge means 4 to move the first housing part 2 and the second housing part 3 to a closed position S according to FIG. 1, in which position the inner surface $2a$ of the first housing part 2 and the inner surface $3a$ of the second housing part 3 face each other, and to an opened position A according to FIG. 2, in which position the inner surface $2a$ of the first housing part 2 and the inner surface $3a$ of the second housing part are exposed.

The device 1 also comprises first input and display means $5a$–$5b$ for the first user interface, which means $5a$–$5b$ are placed on the inner surface $2a$ of the first housing part 2, and on the inner surface $3a$ of the second housing part 3, and second input and display means $6a$–$6b$ for the second user interface, separate from the first input and display means $5a$–$5b$, the means $6a$–$6b$ being placed on the outer surface $3b$ of the second housing part 3. The input and display means $5a$–$5b$ and $6a$–$6b$ typically comprise a keypad section $5b$, $6b$ for entering information, and a display section $5a$, $6a$ for displaying information. The keypad section can also be replaced with a touch screen for feeding information.

In a device, which comprises several user interfaces, it is most advantageous with respect to the use of the device, to activate the different user interfaces alternately, wherein the operation of the other user interface can be completely prevented, or the accidental activation of the functions of the device by the control means of the other user interface can be prevented. The user can select an active user interface, i.e. the one intended for primary use, for example by controlling with a button, but, according to the invention, also in this case the control function of the control means is determined on the basis of the user interface selected active at a time.

Thus, the control means can be used for example in an electronic device, such as a mobile phone, comprising only one housing part, whose each surface has its own user interface, for example for different functions. In addition, it is possible to equip the electronic device with one or more protective covers, for the purpose of covering the user interface at least partly and thus protecting it from unintentional use.

Preferably, the active user interface is determined on the basis of the position of the electronic device, which has the advantage that the user does not need to switch on the user interface. In addition, the advantage in that case is that it is easy for the user to recognize the active user interface in use by the position of the device, wherein confusions in the use of control functions of the control means are avoided. This kind of an electronic device will be described in the following.

Further referring to FIGS. 1 and 2, the electronic device 1 according to a preferred embodiment of the invention is a wireless communication device, wherein the user interface used in the opened position A is a PDA user interface, and the user interface used in the closed position S is a CMT user interface. In the wireless communication device 1 shown in FIG. 2, the keypad section 5b also comprises keys 8a–8d for moving the cursor on the display of the display section 5a to the left, to the right, up and down, and the display section 5a also comprises keys 9a–9d located by the display section 5a, for selecting control functions from the menu presented on the display of the display section 5a. The wireless communication device 1 also comprises an antenna 10.

The electronic device 1 also comprises a control means 7, arranged in connection with the second housing part 3. This control means 7 comprises for example a control part 7a which can be moved with a finger and which is at least partly located inside the second housing part 3, and which control part 7a is at least partly arranged at an opening 3c formed on the inner surface 3a of the second housing part 3.

The control means 7 also comprises bearing parts (not shown in the figure) for fitting the control part 7a with a bearing in connection with the second housing part 3 in such a way that the control part 7a is arranged to move in relation to the second housing part 3, and sensor parts (not shown in the figure) for recognizing the movement of the control part 7a with respect to the second housing part 3 and for transmitting a preferably electric signal according to the movement, i.e. a control signal, to the electronic device 1. The structure of the bearing parts and the sensor parts is known as such by anyone skilled in the art, and consequently, it is not necessary to discuss them in detail in this context.

It is obvious that the control means 7 can also be placed on the first housing part 2 e.g. by the keys 8a–8d, wherein the control part 7a is arranged at openings formed on the inner surface 2a and the outer surface 2b of the first housing part 2. Also in this case the control means 7 can be used in connection with the CMT user interface, even though it is located on the opposite side of the device 1 with respect to this user interface.

Figure 3:
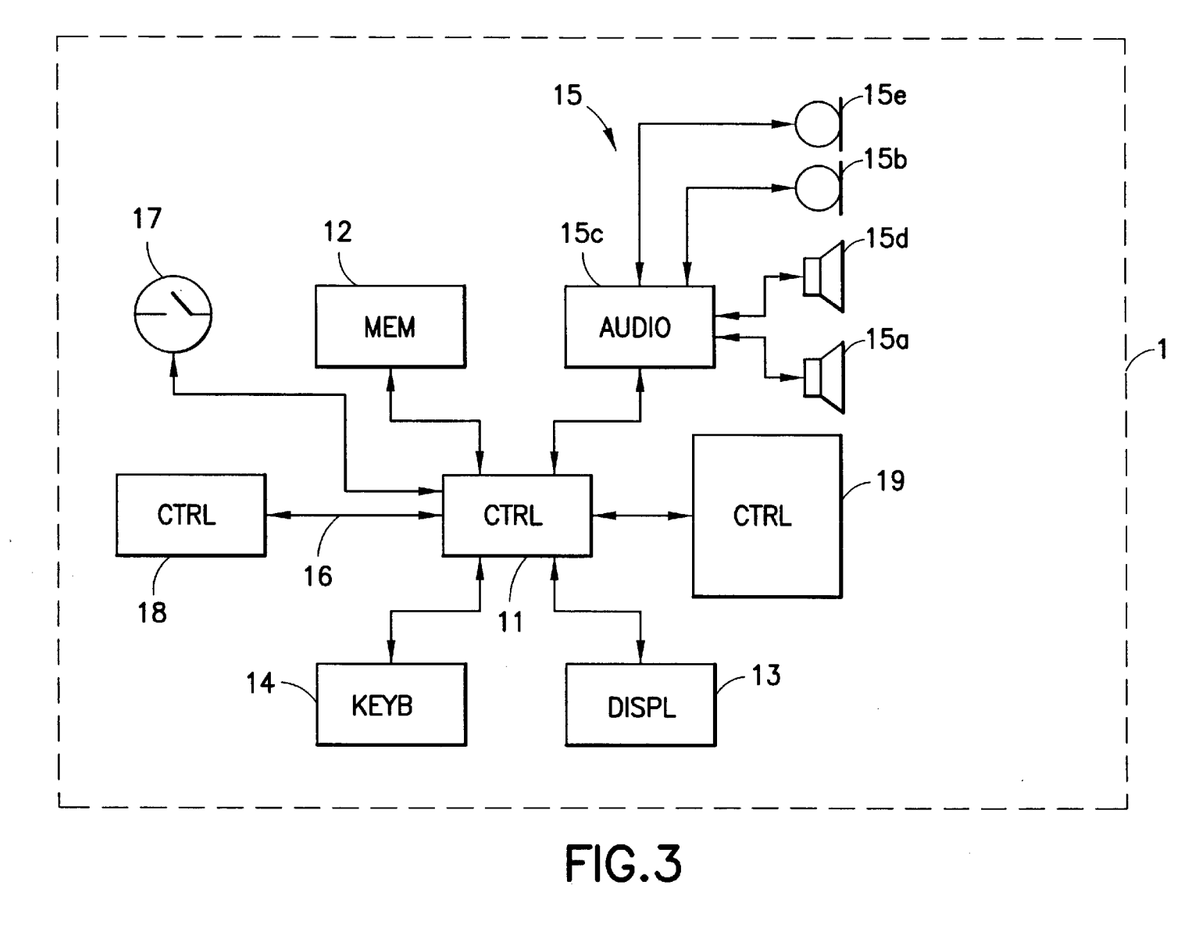
FIG. 3 is a skeleton diagram showing different functional blocks in a wireless communication device according to a preferred embodiment of the invention.

FIG. 3 presents an electronic device 1, i.e. a wireless communication device 1 according to a preferred embodiment of the invention in a reduced block diagram. The wireless communication device 1 comprises for instance a control unit 11, memory means 12, display means 13, and input means 14. The display means 13 correspond to the above described display sections 5a and 6a. The input means 14 correspond to the above described keypad sections 5b and 6b. In addition, the block diagram shows audio means 15, such as a receiver 15a and a microphone 15b, and an audio block 15c e.g. for converting a microphone signal from analog to digital form, and for converting a signal to be transmitted to the receiver 15a from digital to analog form. The audio means 15 can comprise an auxiliary receiver 15d and an auxiliary microphone 15e, for example for the different housing parts 2 and 3 of the device 1. The memory means 12 comprise, for instance, a random access memory (RAM), especially for data storing necessary during the use of the device 1, and a read only memory (ROM) especially for storing programs.

The control unit 11 comprises, for example, a micro controller unit (MCU) and a programmable logic circuit (ASIC, Application Specific Integrated Circuit), and it is also coupled to control blocks 19 or the like, controlling other functions of the wireless communication device 1, such as reception and transmission functions, I/O functions (Input/Output), and the radio parts of the device 1. The control unit 11 is also connected to the control means 7, especially to the sensor elements of the same, from which the control unit 11 receives a control signal 16. The sensor elements 18 comprise, for example, a roll which is pressed against the control part 7a and is rotated under control by the control part 7a, by means of friction. The control signal 16 advantageously contains information on the movement of the control part 7a of the control means 7 around the rotation axes X, Y and Z. Furthermore, the control signal 16 can contain information on the state of the control button attached to the control part 7a.

When the control unit 11 receives the control signal 16, it also defines the position of the housing parts 2 and 3 of the device 1. For this purpose, there are switching means 17, known as such, arranged in connection with the hinge means 4, and they indicate whether the housing parts 2 and 3 are in the opened or closed position. On the basis of the position, the control unit 11 can also select the control function of the control means 7, and give a signal to the display means 13, known as such, to control them in order to activate procedures according to the control function. On the basis of the position, the control unit 11 can select for example either the display part 5a or 6a for displaying information. In this way, the control function of the control means 7 can be determined on the basis of the position of the device 1, and at the same time, on the basis of the position, the desired user interface can be arranged active. If several user interfaces are switched off, also the control means 7 can thus be switched off. It is, of course, obvious that the control unit 11 can affect the function of another block of the device 1, for example the audio block 15c, in a corresponding manner.

Figure 1A:
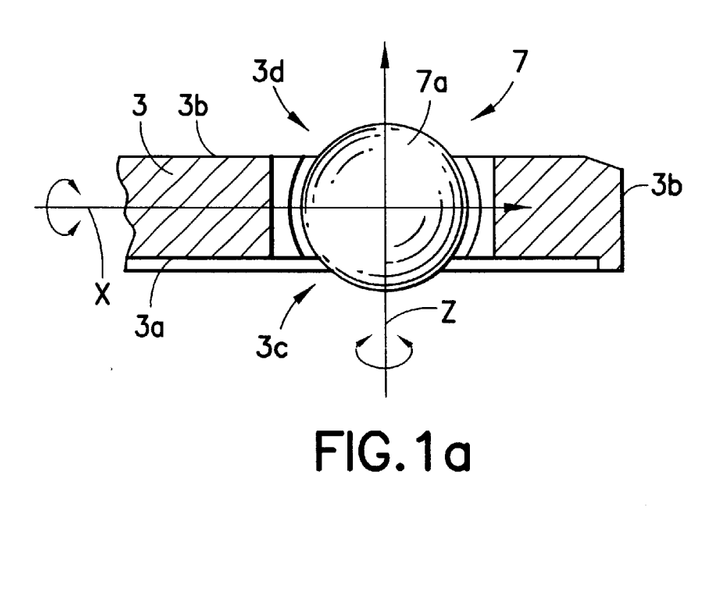
FIG. 1a shows a cross-section of a detail in an electronic device according to a preferred embodiment of the invention, cut from the point L—L of FIG. 1, and viewed from the side.

With reference to FIG. 1a, the control part 7a of the control means 7 in the electronic device 1 is at least partly arranged also at the opening 3d formed on the outer surface 3b of the second housing part 3, on the opposite side of the second housing part 3. Thus, the control means 7 extends through the housing part 3. The control part 7a is located partly inside the housing part 3 and extends outside the housing part 3, through the opening 3d. In FIG. 1a, the control means 7 is shown as a detail of FIG. 1, cut from the point L—L and viewed from the side of the device 1. When using the device 1, it is possible to use the control means 7 both in the opened position A and in the closed position S of the device 1. With reference to FIG. 1a, the opening 3d is arranged on the area of the outer surface 3b, which is substantially parallel to the inner surface, but it is obvious that the opening 3d can also be arranged at the area of the outer surface 3b which is substantially transverse with respect to the inner surface 3a.

With reference to FIGS. 1 and 2, the control part 7a of the device is designed spherical. According to other preferred embodiments of the invention, the control part 7a of the control means 7 can, at least partly, also be designed discoidal, cylindrical, or stick-like. Furthermore, the control part 7a is arranged to pivot around at least one rotation axis Y, substantially parallel to the inner surface 3a. The spherical control part 7a is also arranged to rotate freely around a rotation axis Z substantially perpendicular with respect to the rotation axis Y, and around a rotation axis X, substantially perpendicular with respect to both of the aforementioned axes. The discoidal or cylindrical control part 7a can be arranged to rotate around the rotation axis Y or the rotation axis X. The cylindrical control part 7a can also be arranged to rotate around the rotation axis Z only. It is, of course, obvious that the movement can also be arranged to take place only between two angular positions.

In the case of a spherical control part 7a, its function corresponds to the function of the above-described mouse, especially when two control buttons or the like are placed on the outer surface 3b of the second housing part 3, preferably next to the control means 7, so that the control part 7a of the control means 7 can be controlled with the thumb, the first control button can be pressed with the forefinger, and the second control button with the middle finger. The discoidal control part 7a is arranged in the control means for example in such a way that the advantageously planar sides of the control part 7a are substantially perpendicular with respect to the inner surface 3a of the second housing part 3. The discoidal control part 7a is usually arranged to pivot or rotate around only one rotation axis X or Y. The cylindrical control part 7a corresponds to the discoidal control part 7a in its function, but its second housing part 3 can be considerably longer in the direction of the surface 3a or 3b.

A stick-like control part 7a can be arranged to pivot around only one rotation axis X or Y, but in an advantageous manner, the stick-like control-part 7a is arranged to pivot around both of these, wherein with a joystick-type, rod-like control part 7a, the cursor displayed on the display of the electronic device 1 can be moved to the right, to the left, up and down.

In a rod-like control part 7a, there are bearing parts and sensor parts which are located, for example, in its middle part. Thus, this middle part is designed e.g. spherical, and it allows tilting of the control part 7a in accordance with the rotation axes X and Y. Furthermore, it should be noted that in this specification, rotation axes X, Y, Z, Ka, Kb and Kc primarily refer to the imaginary straight line which runs via the axis parts to be implemented in a way known as such, or with respect to which the control means 7 otherwise allows the control part 7a to pivot or rotate.

When the control part 7a of the control means 7 in the electronic device 1 is e.g. spherical, roll-like or rod-like, the control part 7a is moved with a finger from the direction of the inner surface 3a of the electronic device 1, a parallel movement can be detected simultaneously also from the direction of the outer surface 3b, because the control part 7a substantially extends through the second housing part 3 of the electronic device 1.

Figure 1B:
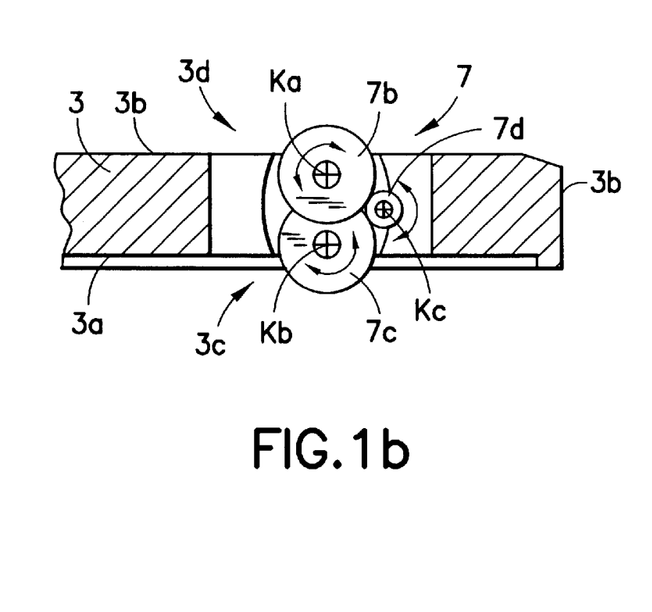
FIG. 1b shows a cross-section of a detail in an electronic device according to the invention, viewed from the side.

With reference to FIG. 1b, the control part 7a according to a preferred embodiment is further divided into a discoidal first part 7b, which is arranged only at an opening 3d formed on the outer surface 3b of the second housing part 3, and discoidal second part 7c, arranged only at an opening 3c formed on the inner surface 3a of the second housing part 3. Thus, the first part 7b is arranged to pivot around a rotation axis Ka, and the second part 7c is arranged to pivot around a rotation axis Kb. The rotation axes Ka and Kb are substantially parallel to each other and substantially perpendicular with respect to the level of drawing in FIG. 1b. The rotation axes Ka and Kb are parallel to the rotation axis X shown in FIG. 1a, but it is obvious that they can also be arranged parallel to the rotation axis Y shown in FIG. 1. The rotation axes Ka and Kb can also be divergent, especially when the second part 7c or the first part 7b are arranged on surfaces of the housing part 2 or 3, which are perpendicular to each other.

Furthermore, the control means 7 comprises advantageously an transfer element 7d, which is arranged to pass the movement of the first part 7b to the second part 7d, and vice versa, wherein the transfer element 7d is arranged to rotate around the rotation axis Kc. When the parts 7b and 7c move simultaneously, the sensor parts (not shown in the figure) for recognizing the movement have to be arranged only in connection with the axis element (not shown in the figure) of part 7b or 7c, wherein a simpler structure is achieved. The rotation axis Kc is parallel to the rotation axes Ka and Kb. The transfer element 7d is pressed simultaneously against the parts 7c and 7d, and passes the movement by means of friction. The advantage of this solution is that the parts 7a and 7b rotate in the same direction. The rotational movement in the same direction corresponds to the movement of the solid spherical control part 7a. It is also possible to transfer the rotational movement for example by means of axis parts and transfer elements, such as gear wheels, running via the rotation axes Kb and Kc. Thus, the rotational movement of the part 7b can be arranged reverse with respect to the part 7c.

According to a preferred embodiment of the invention, the control means 7 is also arranged to function like a control button. Thus, for example the discoidal control part 7a is arranged to move revertively in the direction of the rotation axis Z, inside the control means 7. Consequently, the control means 7 comprises sensor parts to recognize movement. These sensor parts can function at least partly mechanically, photoelectrically, inductively, capacitively, or magnetically. A function corresponding to the control button can also be arranged by placing one control button in a spherical control part 7a, or at the end of a pin-shaped or joystick-type control part 7a, or two control buttons on the opposite sides of the control part 7a.

When the device 1 is in operation, the movement of the control part 7a is utilized to control for example the movement of the cursor on the display 5a of the user interface in question. It is possible to use the control part 7a in a device according to FIGS. 1 and 2 from two different directions only when the device 1 is in the opened position A. It is, of course, possible that when using the second user interface, the control means 7 is assigned another function, for example to open menus on the display of the display section 6a, to select functions from the menu, or to scan an image and lists on the display 6a.

What is claimed is:

1. An electronic device comprising:
   a first housing part, provided with a first inner surface and a first outer surface, a second housing part, provided with a second inner surface and a second outer surface, hinge means for moving the housing parts to a closed position and to a opened position, a first user interface, which is at least partly located on the inner surface of one or more of the housing parts, a second user interface, which is at least partly located on the outer surface of one or more of the housing parts, and a manual controller included in the first housing part, the second housing part or both housing parts, the manual controller extending through one of the housing parts and wherein the manual controller is manually controllable from at least two opposing surfaces of the housing part through which the manual controller extends.

2. The electronic device according to claim 1, wherein the manual controller comprises at least one control part, wherein the control part is at least partly designed spherical, cylindrical, discoidal, or stick-like, and wherein the control part is arranged to rotate around a rotation axis substantially parallel to the inner surface, around a rotation axis substantially or perpendicular with respect to the inner surface, or around both these rotation axes.

3. The electronic device according to claim 2, wherein the control part comprises:

a first part, arranged at an opening formed in the inner surface of one of the housing parts, and a second part, arranged at an opening formed in the outer surface of one of the housing parts, wherein the first part and the second part are arranged to rotate around the respective rotation axis.

4. The electronic device according to claim 3, wherein the first part and the second part are arranged to rotate simultaneously.

5. The electronic device according to claim 1, wherein said manual controller is arranged to be used in connection with the first user interface and the second user interface of the device.

6. The electronic device according to claim 1, wherein:

the manual controller is arranged to be used in connection with the second user interface in the closed position of the device, wherein the manual controller is arranged to be used in connection with the first user interface in the opened position of the device.

7. The electronic device according to claim 1, wherein the electronic device is a wireless communication device.

8. The electronic device according to claim 1 wherein a control function of the manual controller is determined on the basis of the user interface selected active at a time.

9. An electronic device comprising:

a first housing part, provided with a first inner surface and a first outer surface, a second housing part, provided with a second inner surface and a second outer surface, hinge means for moving the housing parts to a closed position and to a opened position, a first user interface, which is at least partly located on the inner surface of one or more of the housing parts, and a second user interface, which is at least partly located on the outer surface of one or more of the housing parts, wherein the first housing part, the second housing part or both housing parts comprise a control means extending through one of the housing parts, wherein the control means comprises:

a first part, arranged at an opening formed in the inner surface of one of said housing parts, and a second part, arranged at an opening formed in the outer surface of one of said housing parts, wherein the first part and the second part are arranged to rotate around the respective rotation axis preferably simultaneously.

10. A control means of an electronic device, which electronic device comprises:

a first housing part, provided with a first inner surface and a first outer surface, a second housing part, provided with a second inner surface and a second outer surface, hinge means for moving the housing parts to a closed position and to a opened position, a first user interface, which is at least partly located on the inner surface of one or more of the housing parts, and a second user interface, which is at least partly located on the outer surface of one or more of the housing parts, wherein the control means comprises means for producing a control signal and transmitting the same to the electronic device to control it by means of the control means, wherein the control means is arranged to extend through the first housing part or the second housing part.

11. A control means of an electronic device, which electronic device comprises:

a first housing part, provided with a first inner surface and a first outer surface, second housing part, provided with a second inner surface and a second outer surface, hinge means for moving the housing parts to a closed position and to a opened position, a first user interface, which is at least partly located on the inner surface of one or more of the housing parts, and a second user interface, which is at least partly located on the outer surface of one or more of the housing parts, wherein the control means comprises means for producing a control signal and transmitting the same to the electronic device to control it by means of the control means, wherein the control means is arranged to extend through the first housing part or the second housing part, wherein the control means comprises:

a first part, arranged at an opening formed in the inner surface of one of said housing parts, and a second part, arranged at an opening formed in the outer surface of one of said housing parts, wherein the first part and the second part are arranged to rotate around a respective rotation axis preferably simultaneously.

12. The control means of claim 11 wherein the first part and the second part are arranged to rotate simultaneously.

13. An electronic device comprising:

a first housing part, provided with a first inner surface and a first outer surface, a second housing part, provided with a second inner surface and a second outer surface, hinge means for moving the housing parts to a closed position and to a opened position, a first user interface, which is at least partly located on the inner surface of one or more of the housing parts, a second user interface, which is at least partly located on the outer surface of one or more of the housing parts, and a control means extending through one of the housing parts, usable for controlling the interfaces on both the inner surfaces and outer surfaces of the housing parts.

14. The electronic device of claim 13 further comprising another control means extending through the other housing part, usable for controlling the interfaces on both the inner surfaces and outer surfaces of the housing parts.

15. The electronic device according to claim 13, wherein the control means comprises at least one control part, and wherein the control part is at least partly designed spherical, cylindrical, discoidal, or stick control configuration.

16. A control means of an electronic device, the electronic device comprising:
   a first housing part, provided with a first inner surface and a first outer surface,
   a second housing part, provided with a second inner surface and a second outer surface,
   hinge means for moving the housing parts to a closed position and to a opened position,
   a first user interface, at least partly located on the inner surface of one or more of the housing parts, and
   a second user interface, at least partly located on the outer surface of one or more of the housing parts,
   the control means comprising means for producing a control signal and transmitting the same to the electronic device to control it by means of the control means,
   wherein the control means is arranged to extend through one of the housing parts,
   wherein the control means is usable for controlling the device both on the inner surface and on the outer surface of the housing part.

17. The control means of claim 16, wherein the control means further comprises at least one control part, wherein the control part is at least partly designed spherical, cylindrical, discoidal, or stick-like, and wherein the control part is arranged to rotate around a rotation axis substantially parallel to the inner surface, around a rotation axis substantially perpendicular with respect to the inner surface, or around both these rotation axes.

18. The control means according to claim 17 wherein the control part comprises:
   a first part, arranged at an opening formed in the inner surface of one of the housing parts, and
   a second part, arranged at an opening formed in the outer suface of one the housing parts,
   wherein the first part and the second part are arranged to rotate around the respective rotation axis.

19. The control means of claim 17 wherein the control part comprises:
   a first part, arranged for an opening formed in the inner surface of said first, second or both of the housing parts, and
   second part, arranged for an opening formed in the outer surface of said first, second or both of the housing parts,
   wherein the first part and the second part are arranged to rotate around a respective rotation axis.

20. The control means according to claim 16, wherein the control means is arranged to be used in connection with the first user interface and the second user interface of the device.

21. The control means of claim 16, wherein the means for producing a control signal comprises a sphere, roll, disc, cylinder, stick or rod extending through the first housing part or the second housing part.

* * * * *